United States Patent
Jang

(10) Patent No.: US 10,971,725 B2
(45) Date of Patent: Apr. 6, 2021

(54) LITHIUM METAL SECONDARY BATTERY CONTAINING ELASTIC POLYMER FOAM AS AN ANODE-PROTECTING LAYER

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 104 days.

(21) Appl. No.: 16/256,321

(22) Filed: Jan. 24, 2019

(65) Prior Publication Data

US 2020/0243854 A1 Jul. 30, 2020

(51) Int. Cl.
| | | |
|---|---|---|
| *H01M 4/40* | (2006.01) | |
| *H01M 4/134* | (2010.01) | |
| *H01M 4/66* | (2006.01) | |
| *H01M 4/62* | (2006.01) | |
| *H01M 4/70* | (2006.01) | |
| *H01M 10/052* | (2010.01) | |
| *H01M 50/463* | (2021.01) | |

(52) U.S. Cl.
CPC ........... *H01M 4/405* (2013.01); *H01M 4/134* (2013.01); *H01M 4/62* (2013.01); *H01M 4/661* (2013.01); *H01M 4/70* (2013.01); *H01M 10/052* (2013.01); *H01M 50/463* (2021.01)

(58) Field of Classification Search
CPC ...... H01M 4/405; H01M 4/134; H01M 4/661; H01M 4/62; H01M 4/70; H01M 2/18; H01M 10/052
See application file for complete search history.

(56) References Cited

U.S. PATENT DOCUMENTS

| | | |
|---|---|---|
| 2,798,878 A | 7/1957 | Hummers |
| 3,836,511 A | 9/1974 | O'farrell et al. |
| 4,720,910 A | 1/1988 | Rourke et al. |

(Continued)

FOREIGN PATENT DOCUMENTS

| | | |
|---|---|---|
| CN | 103258990 A | 8/2013 |
| CN | 105322132 A | 2/2016 |

(Continued)

OTHER PUBLICATIONS

PCT/US19/38881 International Search Report and Written Opinion dated Oct. 18, 2019, 14 pages.

(Continued)

*Primary Examiner* — Carlos Barcena

(57) ABSTRACT

Provided is a lithium metal secondary battery comprising a cathode, an anode, an electrolyte-separator assembly disposed between the cathode and the anode, wherein the anode comprises: (a) an anode active material layer containing a layer of lithium or lithium alloy optionally supported by an anode current collector; and (b) an anode-protecting layer in physical contact with the anode active material layer and in ionic contact with the electrolyte-separator assembly, having a thickness from 10 nm to 500 μm and comprising an elastic polymer foam having a fully recoverable elastic compressive strain from 2% to 500% and pores having a pore volume fraction from 5% to 95% (most preferably 50-95%); wherein preferably the pores are interconnected.

28 Claims, 5 Drawing Sheets

(56) References Cited

U.S. PATENT DOCUMENTS

| | | | |
|---|---|---|---|
| 5,057,339 A | 10/1991 | Ogawa | |
| 5,270,417 A | 12/1993 | Soga et al. | |
| 5,342,710 A | 8/1994 | Koksbang | |
| 5,350,647 A | 9/1994 | Hope et al. | |
| 5,409,785 A | 4/1995 | Nakano et al. | |
| 5,424,151 A | 6/1995 | Koksbang et al. | |
| 5,434,021 A | 7/1995 | Fauteux et al. | |
| 5,460,905 A | 10/1995 | Skotheim | |
| 5,536,599 A | 7/1996 | Alamgir et al. | |
| 5,648,187 A | 7/1997 | Skotheim | |
| 5,961,672 A | 10/1999 | Skotheim et al. | |
| 6,025,094 A | 2/2000 | Visco et al. | |
| 6,218,055 B1* | 4/2001 | Shah | H01M 4/582 |
| | | | 429/215 |
| 6,447,952 B1 | 9/2002 | Spiegel et al. | |
| 6,451,484 B1 | 9/2002 | Han et al. | |
| 6,475,678 B1 | 11/2002 | Suzuki | |
| 6,515,101 B1 | 2/2003 | Sheares | |
| 6,620,547 B1 | 9/2003 | Sung et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,618,678 B2 | 11/2009 | Mao et al. | |
| 8,597,828 B2 | 12/2013 | Martinet et al. | |
| 9,905,856 B1 | 2/2018 | Zhamu et al. | |
| 10,084,182 B2 | 9/2018 | Pan et al. | |
| 10,483,533 B2 | 11/2019 | Zhamu et al. | |
| 10,629,899 B1 | 4/2020 | Jang | |
| 2002/0034685 A1* | 3/2002 | Sato | H01M 10/05 |
| | | | 429/176 |
| 2002/0182488 A1 | 12/2002 | Cho et al. | |
| 2002/0195591 A1 | 12/2002 | Ravet et al. | |
| 2003/0180619 A1 | 9/2003 | Tamura et al. | |
| 2004/0018430 A1 | 1/2004 | Holman et al. | |
| 2005/0034993 A1 | 2/2005 | Gozdz et al. | |
| 2005/0098914 A1 | 5/2005 | Varma et al. | |
| 2005/0118508 A1 | 6/2005 | Yong et al. | |
| 2005/0136330 A1 | 6/2005 | Mao et al. | |
| 2006/0263697 A1* | 11/2006 | Dahn | H01M 10/4235 |
| | | | 429/336 |
| 2007/0059600 A1 | 3/2007 | Kim et al. | |
| 2007/0218369 A1 | 9/2007 | Kaiduka et al. | |
| 2007/0289879 A1 | 12/2007 | Horton | |
| 2008/0248393 A1 | 10/2008 | Richard et al. | |
| 2008/0318128 A1 | 12/2008 | Simoneau et al. | |
| 2009/0155676 A1 | 6/2009 | Zhamu et al. | |
| 2009/0169725 A1 | 7/2009 | Zhamu et al. | |
| 2009/0186093 A1 | 7/2009 | Liu et al. | |
| 2010/0099029 A1 | 4/2010 | Kinoshita et al. | |
| 2010/0112454 A1 | 5/2010 | Visco et al. | |
| 2010/0143798 A1 | 6/2010 | Zhamu et al. | |
| 2010/0173198 A1 | 7/2010 | Zhamu et al. | |
| 2011/0059361 A1 | 3/2011 | Wilkening et al. | |
| 2011/0104571 A1 | 5/2011 | Zhamu et al. | |
| 2011/0143211 A1 | 6/2011 | Takeyama | |
| 2011/0177388 A1 | 7/2011 | Bae et al. | |
| 2011/0244337 A1 | 10/2011 | Ohta et al. | |
| 2011/0262816 A1 | 10/2011 | Amatucci | |
| 2012/0064409 A1 | 3/2012 | Zhamu et al. | |
| 2012/0070708 A1 | 3/2012 | Ohira et al. | |
| 2012/0070746 A1 | 3/2012 | Mikhaylik et al. | |
| 2012/0088154 A1 | 4/2012 | Liu et al. | |
| 2013/0052544 A1 | 2/2013 | Ohkubo et al. | |
| 2013/0054061 A1 | 2/2013 | Nishimoto | |
| 2013/0157141 A1 | 6/2013 | Zhong et al. | |
| 2013/0164615 A1 | 6/2013 | Manthiram et al. | |
| 2013/0171339 A1 | 7/2013 | Wang et al. | |
| 2013/0224603 A1 | 8/2013 | Chen et al. | |
| 2013/0292613 A1 | 11/2013 | Wegner et al. | |
| 2014/0072879 A1 | 3/2014 | Chen et al. | |
| 2014/0147738 A1 | 5/2014 | Chen et al. | |
| 2014/0147751 A1 | 5/2014 | Yang et al. | |
| 2014/0154572 A1 | 6/2014 | Singh et al. | |
| 2014/0162121 A1 | 6/2014 | Ryu et al. | |
| 2014/0178747 A1 | 6/2014 | Tsai et al. | |
| 2014/0234702 A1 | 8/2014 | Zhang et al. | |
| 2014/0235513 A1 | 8/2014 | Kverel et al. | |
| 2014/0363746 A1 | 12/2014 | He et al. | |
| 2015/0044556 A1 | 2/2015 | Wang et al. | |
| 2015/0064568 A1 | 3/2015 | Yushin et al. | |
| 2015/0064574 A1 | 3/2015 | He et al. | |
| 2015/0079485 A1 | 3/2015 | Choi et al. | |
| 2015/0162641 A1* | 6/2015 | Visco | H01M 10/056 |
| | | | 429/246 |
| 2015/0180000 A1 | 6/2015 | Roumi | |
| 2015/0180037 A1 | 6/2015 | Gronwald et al. | |
| 2015/0218323 A1 | 8/2015 | Kim et al. | |
| 2015/0221935 A1 | 8/2015 | Zhou et al. | |
| 2015/0236372 A1 | 8/2015 | Yushin et al. | |
| 2015/0244025 A1 | 8/2015 | Rhee et al. | |
| 2015/0318532 A1 | 11/2015 | Manthiram et al. | |
| 2015/0325844 A1 | 11/2015 | Inoue | |
| 2015/0372294 A1 | 12/2015 | Minami et al. | |
| 2016/0013481 A1 | 1/2016 | Jeong et al. | |
| 2016/0043384 A1 | 2/2016 | Zhamu et al. | |
| 2016/0087266 A1 | 3/2016 | Muldoon et al. | |
| 2016/0126543 A1 | 5/2016 | Ota et al. | |
| 2016/0149216 A1 | 5/2016 | Mizuno et al. | |
| 2016/0181585 A1 | 6/2016 | Choi et al. | |
| 2016/0181611 A1 | 6/2016 | Cho et al. | |
| 2016/0204431 A1 | 7/2016 | Sawa | |
| 2016/0218341 A1 | 7/2016 | Kumar et al. | |
| 2016/0240896 A1 | 8/2016 | Zhang et al. | |
| 2016/0301075 A1 | 10/2016 | Zhamu et al. | |
| 2016/0344035 A1 | 11/2016 | Zhamu et al. | |
| 2016/0351877 A1 | 12/2016 | Kusachi et al. | |
| 2016/0351909 A1 | 12/2016 | Bittner et al. | |
| 2016/0372743 A1 | 12/2016 | Cho et al. | |
| 2016/0372784 A1 | 12/2016 | Hayner et al. | |
| 2017/0002154 A1 | 1/2017 | Hiasa et al. | |
| 2017/0018799 A1 | 1/2017 | Jeong | |
| 2017/0033357 A1 | 2/2017 | Cho et al. | |
| 2017/0047584 A1 | 2/2017 | Hwang et al. | |
| 2017/0062827 A1 | 3/2017 | Bruckmeier et al. | |
| 2017/0062830 A1 | 3/2017 | Bao et al. | |
| 2017/0092986 A1 | 3/2017 | Ogawa et al. | |
| 2017/0098824 A1 | 4/2017 | Fasching et al. | |
| 2017/0098856 A1 | 4/2017 | Zhamu et al. | |
| 2017/0104204 A1 | 4/2017 | Zhamu et al. | |
| 2017/0104217 A1 | 4/2017 | Yu et al. | |
| 2017/0117535 A1 | 4/2017 | Yoon et al. | |
| 2017/0117538 A1 | 4/2017 | Bendimerad et al. | |
| 2017/0117589 A1 | 4/2017 | Tajima et al. | |
| 2017/0141387 A1 | 5/2017 | Hayner et al. | |
| 2017/0141399 A1 | 5/2017 | Lux et al. | |
| 2017/0166722 A1 | 6/2017 | Zhamu et al. | |
| 2017/0179468 A1 | 6/2017 | Fanous et al. | |
| 2017/0194640 A1 | 7/2017 | Bucur et al. | |
| 2017/0194648 A1 | 7/2017 | Bucur et al. | |
| 2017/0200943 A1 | 7/2017 | Kawakami | |
| 2017/0207484 A1 | 7/2017 | Zhamu et al. | |
| 2017/0279125 A1 | 9/2017 | Ohsawa et al. | |
| 2017/0288211 A1 | 10/2017 | Zhamu et al. | |
| 2017/0294643 A1 | 10/2017 | Burshtain et al. | |
| 2017/0309917 A1 | 10/2017 | Lee et al. | |
| 2017/0338472 A1 | 11/2017 | Zhamu et al. | |
| 2017/0338474 A1 | 11/2017 | Lee et al. | |
| 2017/0338490 A1 | 11/2017 | Xiao et al. | |
| 2018/0053978 A1 | 2/2018 | Song et al. | |
| 2018/0083265 A1 | 3/2018 | Singh et al. | |
| 2018/0190975 A1 | 7/2018 | Ishii et al. | |
| 2018/0219215 A1 | 8/2018 | Bucur et al. | |
| 2018/0233736 A1 | 8/2018 | Zhamu et al. | |
| 2018/0241031 A1 | 8/2018 | Pan et al. | |
| 2018/0241032 A1 | 8/2018 | Pan et al. | |
| 2018/0248173 A1 | 8/2018 | Pan et al. | |
| 2018/0277913 A1 | 9/2018 | Pan et al. | |
| 2018/0287142 A1 | 10/2018 | Zhamu et al. | |
| 2018/0294475 A1 | 10/2018 | Zhamu et al. | |
| 2018/0294476 A1 | 10/2018 | Zhamu et al. | |

(56) References Cited

U.S. PATENT DOCUMENTS

| | | | |
|---|---|---|---|
| 2018/0301707 A1 | 10/2018 | Pan et al. |
| 2019/0051905 A1 | 2/2019 | Zhamu et al. |
| 2019/0058185 A1 | 2/2019 | Lee et al. |
| 2019/0077669 A1 | 3/2019 | Zhamu et al. |
| 2019/0081325 A1 | 3/2019 | Takeda et al. |
| 2019/0088958 A1 | 3/2019 | Viner et al. |
| 2019/0260028 A1 | 8/2019 | Zhamu et al. |
| 2019/0319303 A1 | 10/2019 | Kushida et al. |
| 2019/0386332 A1 | 12/2019 | Zhamu et al. |
| 2019/0393466 A1 | 12/2019 | Lin et al. |
| 2019/0393495 A1 | 12/2019 | He et al. |
| 2019/0393510 A1 | 12/2019 | He et al. |
| 2019/0393543 A1 | 12/2019 | Zhamu et al. |

FOREIGN PATENT DOCUMENTS

| | | | |
|---|---|---|---|
| CN | 108899472 A | 11/2018 |
| EP | 2787563 A1 | 10/2014 |
| JP | 1275613 A | 11/1989 |
| JP | 2010160984 A | 7/2010 |
| JP | 2011524611 A | 9/2011 |
| JP | 2015084320 A | 4/2015 |
| JP | 2015176656 A | 10/2015 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015141799 A1 | 9/2015 |
| WO | 2016015915 A1 | 2/2016 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. Appl. No. 14/999,080 Nonfinal Office Action dated Nov. 9, 2018.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Dec. 28, 2018, 24 pages.
U.S. Appl. No. 15/442,803 Nonfinal Office Action dated Jul. 25, 2019, 37 pages.
U.S. Appl. No. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/478,125 Nonfinal Office Action dated Mar. 5, 2020, 11 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Final Office Action dated Dec. 27, 2019, 22 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Final Office Action dated Jan. 20, 2020, 9 pages.
U.S. Appl. No. 15/483,348 Nonfinal Office Action dated Nov. 21, 2018, 22 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.
U.S. Appl. No. 15/676,680 Nonfinal Office Action dated May 20, 2020, 8 pages.
U.S. Appl. No. 15/901,367 Nonfinal Office Action dated Jun. 10, 2019, 12 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/914,216 Final Office Action dated Dec. 19, 2019, 9 pages.
U.S. Appl. No. 15/954,088 Nonfinal Office Action dated Mar. 13, 2020, 9 pages.
U.S. Appl. No. 16/010,213 Nonfinal Office Action dated Mar. 27, 2020, 12 pages.
U.S. Appl. No. 16/010,225 Nonfinal Office Action dated Mar. 27, 2020, 13 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/112,208 Nonfinal Office Action dated Apr. 2, 2020, 7 pages.
U.S. Appl. No. 16/112,225 Nonfinal Office Action dated May 13, 2020, 9 pages.
U.S. Appl. No. 16/113,676 Nonfinal Office Action dated Oct. 4, 2019, 9 pages.
U.S. Appl. No. 16/113,676 Final Office Action dated Apr. 9, 2020, 15 pages.

(56) References Cited

OTHER PUBLICATIONS

U.S. Appl. No. 16/116,329 Nonfinal Office Action dated Mar. 30, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Nonfinal Office Action dated Mar. 30, 2020, 6 pages.
U.S. Appl. No. 16/126,745 Nonfinal Office Action dated Mar. 30, 2020, 6 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/166,574 Nonfinal Office Action dated Oct. 4, 2019, 9 pages.
U.S. Appl. No. 16/238,052 Nonfinal Office Action dated Apr. 3, 2020, 14 pages.
U.S. Appl. No. 16/256,346 Nonfinal Office Action dated May 19, 2020, 16 pages.
Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
"Nylon" en.wikipedia.org/wiki/Nylon. Accessed Feb. 18, 2020 (Year: 2020).
An et al., "Diameter-Selected Synthesis of Single Crystalline Trigonal Selenium Nanowires" Materials Chemistry and Physics (2007) vol. 101, No. 2-3, pp. 357-361.
An et al., "Large-Scale Synthesis of High Quality Trigonal Selenium Nanowires" European Journal of Inorganic Chemistry (2003) vol. 17, pp. 3250-3255.
Arai et al., "Versatile supramolecular cross-linker: a rotaxane cross-linker that directly endows vinyl polymers with movable cross-links" Chemistry (2013) vol. 19, pp. 5917-5923.
AZO Materials Table of Properties on Styrene Butadiene Rubber, 5 pages.
Buonerba et al., "Novel Synthetic Strategy for the Sulfonation of Polybutadiene and Styrene-Butadiene Copolymers" Macromolecules (2013) vol. 46, pp. 778-784.
Chen et al., "Selenium nanowires and nanotubes synthesized via a facile template-free solution method" Materials Research Bulletin (2010) vol. 45, pp. 699-704.
Choi et al., "Highly elastic binders integrating polyrotaxanes for silicon microparticle anodes in lithium ion batteries" Science (2017) vol. 357, No. 6348, pp. 279-283.

Dwivedi et al., "An Organic Acid-induced Synthesis and Characterization of Selenium Nanoparticles" Journal of Nanotechnology (2011) Article ID 651971, 6 pages.
Elabd et al., "Sulfonation and Characterization of Poly(styrene-isobutylene-styrene) Triblock Copolymers at High Ion-Exchange Capacities" Polymer (2004) vol. 45, pp. 3037-3043.
Fan et al., "Hollow selenium encapsulated into 3D graphene hydrogels for lithium-selenium batteries with high rate performance and cycling stability" RSC Adv. (2017) vol. 7, pp. 21281-21286.
Gao et al., "Hollow Sphere Selenium Nanoparticles: Their In-Vitro Anti Hydroxyl Radical Effect" Advanced Materials (2002), vol. 14, No. 4, pp. 290-293.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Ji et al., "A highly ordered nanostructured carbon-sulphur cathode for lithium-sulphur batteries" Nature Materials (2009) vol. 8, pp. 500-506.
Karlicky et al., "Halogenated Graphenes: Rapidly Growing Family of Graphene Derivatives" ACS Nano (2013) vol. 1, No. 8, pp. 6434-6464.
KR-10-2015-0044333 English language translation.
Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Liu et al., "Solutions for the problems of silicon-carbon anode materials for lithium-ion batteries" Royal Society Open Science (2018) vol. 5, p. 172370.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.

(56) References Cited

OTHER PUBLICATIONS

PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
U.S. Appl. No. 15/434,632, Final Office Action, dated Jan. 4, 2021, 20 pages.
U.S. Appl. No. 15/434,632, Nonfinal Office Action, dated Jun. 26, 2020, 19 pages.
U.S. Appl. No. 15/442,803, Nonfinal Office Action, dated Jul. 20, 2020, 8 pages.
U.S. Appl. No. 15/478,125, Final Office Action, dated Sep. 3, 2020, 19 pages.
U.S. Appl. No. 15/483,347, Nonfinal Office Action, dated Jun. 17, 2020, 14 pages.
U.S. Appl. No. 15/914,213, Nonfinal Office Action, dated Aug. 31, 2020, 8 pages.
U.S. Appl. No. 15/954,046, Nonfinal Office Action, dated Nov. 20, 2020, 10 pages.
U.S. Appl. No. 15/954,088, Final Office Action, dated Aug. 7, 2020, 8 pages.
U.S. Appl. No. 16/010,213, Final Office Action, dated Jun. 15, 2018, 10 pages.
U.S. Appl. No. 16/010,213, Nonfinal Office Action, dated Jan. 6, 2021, 10 pages.
U.S. Appl. No. 16/010,225, Final Office Action, dated Jul. 8, 2020, 7 pages.
U.S. Appl. No. 16/109,142, Nonfinal Office Action, dated Oct. 13, 2020, 9 pages.
U.S. Appl. No. 16/112,225, Final Office Action, dated Oct. 1, 2020, 12 pages.
U.S. Appl. No. 16/113,676, Nonfinal Office Action, dated Dec. 24, 2020, 12 pages.
U.S. Appl. No. 16/114,959, Final Office Action, dated Jul. 22, 2020, 6 pages.
U.S. Appl. No. 16/116,329, Final Office Action, dated Jul. 23, 2020, 6 pages.
U.S. Appl. No. 16/116,341 Final Office Action, dated Jul. 23, 2020, 6 pages.
U.S. Appl. No. 16/120,875, Nonfinal Office Action, dated Dec. 30, 2020, 14 pages.
U.S. Appl. No. 16/123,218, Nonfinal Office Action, dated Dec. 30, 2020, 11 pages.
U.S. Appl. No. 16/126,736, Final Office Action, dated Jul. 23, 2020, 6 pages.
U.S. Appl. No. 16/126,745, Final Office Action, dated Jul. 23, 2020, 6 pages.
U.S. Appl. No. 16/160,257, Final Office Action, dated Oct. 14, 2020, 15 pages.
U.S. Appl. No. 16/166,536, Final Office Action, dated Nov. 18, 2020, 7 pages.
U.S. Appl. No. 16/166,574, Nonfinal Office Action, dated Dec. 30, 2020, 9 pages.
U.S. Appl. No. 16/238,052, Final Office Action, dated Oct. 14, 2020, 15 pages.
U.S. Appl. No. 16/238,061, Nonfinal Office Action, dated Aug. 14, 2020, 8 pages.
U.S. Appl. No. 16/256,346, Final Office Action, dated Dec. 8, 2020, 18 pages.
U.S. Appl. No. 16/014,623, Nonfinal Office Action, dated Dec. 24, 2020, 11 pages.

* cited by examiner

LITHIUM METAL SECONDARY BATTERY CONTAINING ELASTIC POLYMER FOAM AS AN ANODE-PROTECTING LAYER

FIELD OF THE INVENTION

The present invention relates to the field of rechargeable lithium metal battery having lithium metal as an anode active material and a method of manufacturing same.

BACKGROUND OF THE INVENTION

Lithium-ion and lithium (Li) metal cells (including lithium metal secondary cell, lithium-sulfur cell, lithium-selenium cell, Li-air cell, etc.) are considered promising power sources for electric vehicle (EV), hybrid electric vehicle (HEV), and portable electronic devices, such as lap-top computers and mobile phones. Lithium metal has the highest capacity (3,861 mAh/g) compared to any other metal or metal-intercalated compound (except $Li_{4.4}Si$) as an anode active material. Hence, in general, rechargeable Li metal batteries have a significantly higher energy density than lithium ion batteries.

Historically, rechargeable lithium metal batteries were produced using non-lithiated compounds having high specific capacities, such as $TiS_2$, $MoS_2$, $MnO_2$, $CoO_2$ and $V_2O_5$, as the cathode active materials, which were coupled with a lithium metal anode. When the battery was discharged, lithium ions were dissolved from the lithium metal anode and transferred to the cathode through the electrolyte and, thus, the cathode became lithiated. Unfortunately, upon cycling, the lithium metal resulted in the formation of dendrites that ultimately caused unsafe conditions in the battery. As a result, the production of these types of secondary batteries was stopped in the early 1990's giving ways to lithium-ion batteries.

Even now, cycling stability and safety concerns remain the primary factors preventing the further commercialization of Li metal batteries for EV, HEV, and microelectronic device applications. These issues are primarily due to the high tendency for Li to form dendrite structures during repeated charge-discharge cycles or an overcharge, leading to internal electrical shorting and thermal runaway. Many attempts have been made to address the dendrite-related issues, as briefly summarized below:

Fauteux, et al. [D. Fauteux, et al., "Secondary Electrolytic Cell and Electrolytic Process," U.S. Pat. No. 5,434,021, Jul. 18, 1995] applied to a metal anode a protective surface layer (e.g., a mixture of polynuclear aromatic and polyethylene oxide) that enables transfer of metal ions from the metal anode to the electrolyte and back. The surface layer is also electronically conductive so that the ions will be uniformly attracted back onto the metal anode during electrodeposition (i.e. during battery recharge). Alamgir, et al. [M. Alamgir, et al. "Solid polymer electrolyte batteries containing metallocenes," U.S. Pat. No. 5,536,599, Jul. 16, 1996] used ferrocenes to prevent chemical overcharge and dendrite formation in a solid polymer electrolyte-based rechargeable battery.

Skotheim [T. A. Skotheim, "Stabilized Anode for Lithium-Polymer Battery," U.S. Pat. No. 5,648,187 (Jul. 15, 1997); U.S. Pat. No. 5,961,672 (Oct. 5, 1999)] provided a Li metal anode that was stabilized against the dendrite formation by the use of a vacuum-evaporated thin film of a Li ion-conducting polymer interposed between the Li metal anode and the electrolyte. Skotheim, et al. [T. A. Skotheim, et al. "Lithium Anodes for Electrochemical Cells," U.S. Pat. No. 6,733,924 (May 11, 2004); U.S. Pat. No. 6,797,428 (Sep. 28, 2004); U.S. Pat. No. 6,936,381 (Aug. 30, 2005); and U.S. Pat. No. 7,247,408 (Jul. 24, 2007)] further proposed a multilayer anode structure consisting of a Li metal-based first layer, a second layer of a temporary protective metal (e.g., Cu, Mg, and Al), and a third layer that is composed of at least one layer (typically 2 or more layers) of a single ion-conducting glass, such as lithium silicate and lithium phosphate, or polymer. It is clear that such an anode structure, consisting of at least 3 or 4 layers, is too complex and too costly to make and use.

Protective coatings for Li anodes, such as glassy surface layers of $LiI-Li_3PO_4-P_2S_5$, may be obtained from plasma assisted deposition [S. J. Visco, et al., "Protective Coatings for Negative Electrodes," U.S. Pat. No. 6,025,094 (Feb. 15, 2000)]. Complex, multi-layer protective coatings were also proposed by Visco, et al. [S. J. Visco, et al., "Protected Active Metal Electrode and Battery Cell Structures with Non-aqueous Interlayer Architecture," U.S. Pat. No. 7,282,295 (Oct. 16, 2007); U.S. Pat. No. 7,282,296 (Oct. 16, 2007); and U.S. Pat. No. 7,282,302 (Oct. 16, 2007)].

Despite these earlier efforts, no rechargeable Li metal batteries have yet succeeded in the market place. This is likely due to the notion that these prior art approaches still have major deficiencies. For instance, in several cases, the anode or electrolyte structures are too complex. In others, the materials are too costly or the processes for making these materials are too laborious or difficult. Solid electrolytes typically have a low lithium ion conductivity, are difficult to produce and difficult to implement into a battery.

Furthermore, solid electrolyte, as the sole electrolyte in a cell or as an anode-protecting layer (interposed between the lithium film and the liquid electrolyte) does not have and cannot maintain a good contact with the lithium metal. This effectively reduces the effectiveness of the electrolyte to support dissolution of lithium ions (during battery discharge), transport lithium ions, and allowing the lithium ions to re-deposit back onto the lithium anode (during battery recharge).

Another major issue associated with the lithium metal anode is the continuing reactions between electrolyte and lithium metal, leading to repeated formation of "dead lithium-containing species" that cannot be re-deposited back to the anode and become isolated from the anode. These reactions continue to irreversibly consume electrolyte and lithium metal, resulting in rapid capacity decay. In order to compensate for this continuing loss of lithium metal, an excessive amount of lithium metal (3-5 times higher amount than what would be required) is typically implemented at the anode when the battery is made. This adds not only costs but also a significant weight and volume to a battery, reducing the energy density of the battery cell. This important issue has been largely ignored and there has been no plausible solution to this problem in battery industry.

Clearly, an urgent need exists for a simpler, more cost-effective, and easier-to-implement approach to preventing Li metal dendrite-induced internal short circuit and thermal runaway problems in Li metal batteries, and to reducing or eliminating the detrimental reactions between lithium metal and the electrolyte.

Hence, an object of the present invention was to provide an effective way to overcome the lithium metal dendrite and reaction problems in all types of Li metal batteries having a lithium metal anode. A specific object of the present invention was to provide a lithium metal cell that exhibits a high specific capacity, high specific energy, high degree of safety, and a long and stable cycle life.

SUMMARY OF THE INVENTION

The invention provides a lithium metal secondary battery, comprising a cathode, an anode, an electrolyte-separator assembly disposed between the cathode and the anode, wherein the anode comprises: (a) an anode active material layer containing a layer of lithium or lithium alloy, in a form of a foil, coating, or multiple particles aggregated together, as an anode active material, wherein the anode active material layer is optionally supported by an anode current collector; and (b) an anode-protecting layer in physical contact with the anode active material layer and in ionic contact with the electrolyte-separator assembly, having a thickness from 10 nm to 500 μm and comprising an elastic polymer foam having a fully recoverable compressive elastic strain from 2% to 500% and pores having a pore volume fraction from 5% to 98% (preferably at least 10%, more preferably at least 20%, further more preferably at least 30%, and even most preferably at least 40%, and most preferably from 50% to 95%) based on the polymer foam volume. Preferably, the pores in the elastic polymer foam are interconnected. More preferably, the elastic polymer foam is an open-cell foam.

For the purpose of defining claims, the battery in instant application does not include lithium-sulfur battery or lithium-selenium battery.

It may be noted that a lithium metal battery or lithium-ion battery can have its lithium ion source initially located in the anode or the cathode when the battery cell is made. In a typical lithium-ion battery, the lithium ion source is stored in the cathode (e.g. Li element in the $LiCoO_2$ or $LiMn_2O_4$ formula). During the first charge process (e.g. during the first electrochemical formation process after the cell is made), some of the Li ions come out of the cathode active material and move to the anode side. The cathode active material, by losing x amount, becomes $Li_{(1-x)}CoO_2$ or $Li_{(1-x)}Mn_2O_4$, where $0 < x \leq 1$.

In a typical lithium metal battery, lithium source is located in the anode side in the form of a Li foil, Li coating, Li particles etc. During the first discharge procedure, lithium ions are ionized and released from this lithium source and move to the cathode side. During a subsequent recharge procedure, lithium ions return to the anode side, attempting to deposit onto the surface of a current collector or the unused lithium foil.

In certain embodiments, the invention provides a lithium metal secondary battery comprising a cathode, an anode, an electrolyte-separator assembly disposed between the cathode and the anode, wherein the anode comprises: (A) an anode current collector (substantially free of lithium on the current collector surface when the cell is made); and (B) an anode-protecting layer supported by the anode current collector and in ionic contact with the electrolyte-separator assembly, having a thickness from 10 nm to 500 μm and comprising an elastic polymer foam having a fully recoverable compressive elastic strain from 2% to 500% and pores having a pore volume fraction from 5% to 98% based on the polymer foam volume; wherein the battery does not include lithium-sulfur battery or lithium-selenium battery. The lithium ion source may be implemented in the cathode active material (as in a typical lithium-ion battery) or in the anode side (e.g. as a lithium foil or lithium coating coated on the surface of a current collector).

In some embodiments, the electrolyte-separator assembly comprises an electrolyte or a combination of a porous separator and an electrolyte in ionic contact with the anode and the cathode. When the electrolyte contains a solid state electrolyte, a porous separator or membrane may or may not be necessary. A porous separator is normally required if the electrolyte is a liquid or gel electrolyte.

In certain embodiments, the electrolyte is selected from organic liquid electrolyte, ionic liquid electrolyte, polymer gel electrolyte, solid-state electrolyte, quasi-solid electrolyte having a lithium salt dissolved in an organic or ionic liquid with a lithium salt concentration preferably higher than 2.0 M (from 2.0 M to 14 M), or a combination thereof.

Preferably, the anode active material layer, the elastic polymer foam-based anode-protecting layer, the electrolyte (e.g. solid-state electrolyte) or electrolyte/separator assembly, and the cathode layer are laminated together in such a manner (e.g. roll-pressed together) that the resulting cell is under a compressive stress or strain for the purpose of maintaining a good contact between the anode active material layer and the anode-protecting layer.

In the lithium metal secondary battery, the non-solid state electrolyte is selected from organic liquid electrolyte, ionic liquid electrolyte, polymer gel electrolyte, quasi-solid electrolyte having a lithium salt dissolved in an organic or ionic liquid with a lithium salt concentration higher than 2.0 M (from 2.0 M to 14 M; typically from 2.5 M to 10 M; and more typically from 3.5M to 7 M), or a combination thereof.

It is well-known in the art that a porous separator may not be necessary if the electrolyte is a solid-state electrolyte; but, a porous separator is normally required in order to electronically separate the anode from the cathode if the electrolyte contains a liquid ingredient, such as in an organic liquid electrolyte, ionic liquid electrolyte, polymer gel electrolyte (polymer+liquid solvent), and quasi-solid electrolyte. The elastic polymer foam layer plays the roles of protecting the lithium anode, preventing lithium dendrite formation and penetration, provides an environment conducive to uniform and uninterrupted transport and re-deposition of lithium ions, etc.

The foil or coating of lithium or lithium alloy may be supported by a current collector (e.g. a Cu foil, a Ni foam, a porous layer of nanofilaments, such as graphene sheets, carbon nanofibers, carbon nanotubes, etc.).

For defining the claims, the invented lithium metal secondary battery does not include a lithium-sulfur cell or lithium-selenium cell. As such, the cathode does not include sulfur, lithium polysulfide, selenium, and lithium polyselenide.

The elastomer-based polymer foam is a high-elasticity material which exhibits an elastic deformation that is at least 2% (preferably at least 5% and up to approximately 500%) when measured under uniaxial compression. In the field of materials science and engineering, the "elastic deformation" is defined as a deformation of a material (when being mechanically stressed) that is essentially fully recoverable upon release of the load and the recovery process is essentially instantaneous (no or little time delay). The elastic compressive deformation is more preferably greater than 10%, even more preferably greater than 30%, further more preferably greater than 50%, and still more preferably greater than 100% under compression.

Preferably, the elastomer-based polymer foam contains a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof. These elastomers or rubbers, when present without graphene sheets, exhibit a high elasticity (having a fully recoverable compressive strain from 2% to 500%). In other words, they can be stretched up to 500% (5 times of the original length when under compression) and, upon release of the compressive stress, they can fully recover back to the original dimension. By adding from 0.01% to 50% by weight of a non-conductive reinforcement material and/or a lithium ion-conducting species dispersed in an elastomeric matrix material, the fully recoverable compressive strains in an elastomer are typically reduced down to 2%-300% (more typically from 5% to 100% and most typically from 10% to 50%).

The elastomer, if sulfonated, becomes significantly more lithium ion-conducting. The lithium ion conductivity of an elastomer, sulfonated or un-sulfonated, may be further improved if some desired amount of lithium ion-conducting additive is incorporated into the elastomer matrix.

It may be noted that lithium foil/coating layer may decrease in thickness due to dissolution of lithium into the electrolyte to become lithium ions as the lithium battery is discharged, creating a gap between the current collector and the protective layer if the protective layer were not elastic. Such a gap would make the re-deposition of lithium ions back to the anode impossible. We have observed that the instant elastic polymer foam layer is capable of expanding or shrinking congruently or conformably with the anode layer. This capability helps to maintain a good contact between the current collector (or the lithium film itself) and the protective layer, enabling the re-deposition of lithium ions without interruption.

The elastic polymer foam may further contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In some embodiments, the elastic polymer foam contains an elastomer selected from a sulfonated or un-sulfonated version of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, or a combination thereof.

In some embodiments, the elastic polymer foam further contains a lithium ion-conducting additive dispersed therein, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\le1$, $1\le y\le4$.

In certain embodiments, the elastomer comprises from 0.01% to 50% of an electrically non-conducting reinforcement material dispersed therein, wherein the reinforcement material is selected from a glass fiber, ceramic fiber, polymer fiber, or a combination thereof. The electrically non-conductive reinforcement may also be selected from glass particles, ceramic particles, polymer particles, etc. The reinforcement material can increase the mechanical strength and the lithium dendrite penetration resistance of the elastomer layer.

The cathode active material may be selected from an inorganic material, an organic material, a polymeric material, or a combination thereof. The inorganic material may be selected from a metal oxide, metal phosphate, metal silicide, metal selenide, metal sulfide, or a combination thereof.

The inorganic material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, CuF, $SnF_2$, AgF, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y\le1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile ($HAT(CN)_6$), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm. In some embodiments, one particle or a cluster of particles may be coated with or embraced by a layer of carbon disposed between the particle(s) and/or a sulfonated elastomer composite layer (an encapsulating shell).

The cathode layer may further contain a graphite, graphene, or carbon material mixed with the cathode active material particles. The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The cathode active material particles may be coated with or embraced by a conductive protective coating, selected from a carbon material, graphene, electronically conductive polymer, conductive metal oxide, or conductive metal coating.

The present invention also provides a lithium metal-air battery comprising an air cathode, an anode comprising the anode-protecting layer as defined above and disposed between the anode and the air cathode without using a conventional porous separator or membrane. In the air cathode, oxygen from the open air (or from an oxygen supplier external to the battery) is the primary cathode active material. The air cathode needs an inert material to support the lithium oxide material formed at the cathode. The applicants have surprisingly found that an integrated structure of conductive nanofilaments can be used as an air cathode intended for supporting the discharge product (e.g., lithium oxide).

Hence, a further embodiment of the present invention is a lithium metal-air battery, wherein the air cathode comprises an integrated structure of electrically conductive nanometer-scaled filaments that are interconnected to form a porous network of electron-conducting paths comprising interconnected pores, wherein the filaments have a transverse dimension less than 500 nm (preferably less than 100 nm). These nanofilaments can be selected from carbon nanotubes (CNTs), carbon nanofibers (CNFs), graphene sheets, carbon fibers, graphite fibers, etc.

The invention also provides a method of manufacturing a lithium battery, the method comprising: (a) providing a cathode active material layer and an optional cathode current collector to support the cathode active material layer; (b) providing an anode active material layer (containing a lithium metal or lithium alloy foil or coating) and an optional anode current collector to support the lithium metal or lithium alloy foil or coating; (c) providing an electrolyte in contact with the anode active material layer and the cathode active material layer without using a separator to electrically separate the anode and the cathode; (d) providing an anode-protecting layer of an elastomer having a recoverable tensile elastic strain from 2% to 1,000% (preferably from 5% to 300%), a lithium ion conductivity no less than $10^{-8}$ S/cm at room temperature, and a thickness from 1 nm to 100 μm (preferably from 10 nm to 10 μm). This anode-protecting layer is disposed between the lithium metal or lithium alloy foil/coating and the cathode.

The invention also provides a method of improving the cycle-life of a lithium metal secondary battery (not including a lithium-sulfur battery or lithium-selenium battery). The method comprises implementing an elastic polymer foam-based anode-protecting layer in the battery. The anode-protecting layer comprises an elastic polymer foam having a recoverable compressive elastic strain from 2% to 500% (preferably from 5% to 300%).

In some embodiments, the elastomer contains a material selected from a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly (ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In the above-defined method, the step implementing an anode-protecting layer may be conducted by depositing a layer of an elastomer onto one primary surface of the anode active material layer. This step comprises optionally compressing the protected anode to improve a contact between the anode-protecting layer and the anode active material layer, followed by combining the protected anode and the cathode together to form the lithium metal secondary battery. A good contact between the anode active material layer and the anode-protecting layer is essential to reducing internal resistance.

In certain embodiments, the step of implementing the anode-protecting layer is conducted by (i) preparing an anode active material layer; (ii) preparing a free-standing layer of an elastomer; and (iii) combining the anode active material layer, the elastomer layer, a cathode, and a non-solid state electrolyte together to form the lithium metal secondary battery. A compressive stress may be advantageously applied (e.g. via press-rolling) to improve the contact between the anode-protecting layer and the anode active material layer to be protected.

Preferably, the elastomer layer has a lithium-ion conductivity from $10^{-5}$ S/cm to $5 \times 10^{-2}$ S/cm. In some embodiments, the elastomer has a recoverable tensile strain from 10% to 300% (more preferably >30%, and further more preferably >50%).

In certain embodiments, the procedure of providing an elastomer contains providing a mixture/blend/composite of an elastomer (sulfonated or un-sulfonated) with a lithium-ion conducting material, a reinforcement material (e.g. glass fibers, polymer fibers, etc.), or a combination thereof.

In this mixture/blend/composite, the lithium ion-conducting material is dispersed in the elastomer and is preferably selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, or a combination thereof, wherein X =F, Cl, I, or Br, R=a hydrocarbon group, $0<x \leq 1$, $1 \leq y \leq 4$.

In some embodiments, the lithium ion-conducting material is dispersed in the sulfonated elastomer composite and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The anode-protecting layer implemented between the anode active layer and the cathode is mainly for the purpose of reducing or eliminating the lithium metal dendrite by providing a more stable Li metal-electrolyte interface that is more conducive to uniform deposition of Li metal during battery charges. The anode-protecting layer also acts to block the penetration of any dendrite, if initiated, from reaching the cathode. The anode-protecting layer, being highly elastic, also can shrink or expands conformably, responsive to the thickness increase or decrease of the anode active material layer. Other advantages will become more transparent later.

DESCRIPTION OF THE PREFERRED EMBODIMENTS

Figure 1:
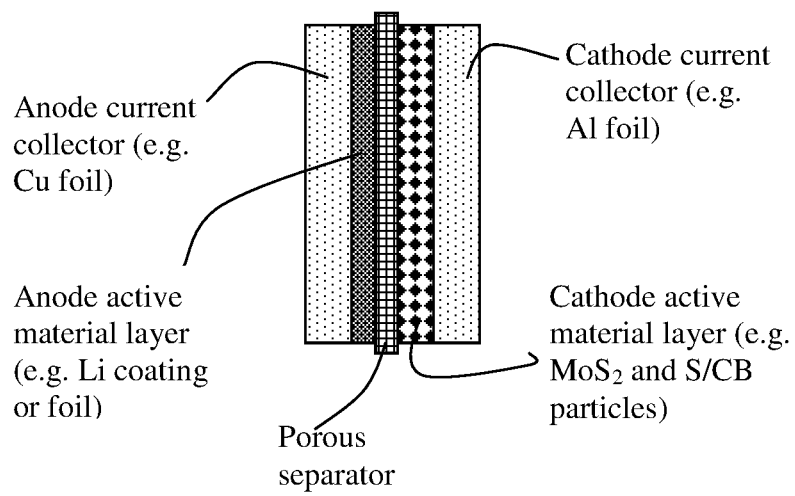
FIG. 1 Schematic of a prior art lithium metal battery cell, containing an anode layer (a thin Li foil or Li coating deposited on a surface of a current collector, Cu foil), a porous separator, and a cathode active material layer, which is composed of particles of a cathode active material, a conductive additive (not shown) and a resin binder (not shown). A cathode current collector supporting the cathode active layer is also shown.

This invention is directed at a lithium metal secondary battery, which is preferably based on an organic electrolyte, a polymer gel electrolyte, an ionic liquid electrolyte, a quasi-solid electrolyte, or a solid-state electrolyte. The shape of a lithium metal secondary battery can be cylindrical, square, button-like, etc. The present invention is not limited to any battery shape or configuration or any type of electrolyte. The invented lithium secondary battery does not include a lithium-sulfur cell or lithium-selenium cell.

The invention provides a lithium metal secondary battery, comprising a cathode, an anode, an anode-protecting layer disposed between the anode and a porous separator or a solid-state electrolyte (in lieu of a porous separator).

In certain embodiments, the anode comprises: (a) a layer of lithium or lithium alloy (in the form of a foil, coating, or multiple particles aggregated together) as an anode active material layer; and (b) an anode-protecting layer, in contact with the anode active material layer, having a thickness from 10 nm to 500 µm and comprising an elastic polymer foam having a fully recoverable compressive elastic strain from 2% to 500% and pores having a pore volume fraction from 5% to 98% based on the total foamed polymer structure.

The foil or coating of lithium or lithium alloy, as the anode active material layer or electrode, may be supported by a current collector (e.g. a Cu foil, a Ni foam, a porous layer of nanofilaments, such as membrane, paper, or fabric of graphene sheets, carbon nanofibers, carbon nanotubes, etc., forming a 3D interconnected network of electron-conducting pathways).

In certain embodiments, the invention provides a lithium metal secondary battery comprising a cathode, an anode, an electrolyte-separator assembly disposed between the cathode and the anode, wherein the anode comprises: (A) an anode current collector; and (B) an anode-protecting layer supported by the anode current collector and in ionic contact with the electrolyte-separator assembly, having a thickness from 10 nm to 500 µm and comprising an elastic polymer foam having a fully recoverable compressive elastic strain from 2% to 500% and pores having a pore volume fraction from 5% to 98% based on the polymer foam volume; wherein the battery does not include lithium-sulfur battery or lithium-selenium battery. The lithium ion source may be implemented in the cathode active material (as in a typical lithium-ion battery) or in the anode side (e.g. as a lithium foil or lithium coating coated on the surface of a current collector). Preferably, the pores in the elastic polymer foam are interconnected. More preferably, the elastic polymer foam is an open-cell foam.

In some embodiments, the electrolyte-separator assembly comprises an electrolyte or a porous separator and an electrolyte in ionic contact with the anode and the cathode. When the electrolyte contains a solid state electrolyte, a porous separator or membrane may or may not be necessary. A porous separator is normally required if the electrolyte is a liquid or gel electrolyte.

Also herein provided is a method of improving a cycle-life of a lithium metal secondary battery, the method comprising a procedure of implementing an anode-protecting layer between an anode active material layer (or an anode current collector) and a porous separator-electrolyte assembly, wherein the anode-protecting layer is in a physical contact with the anode active material layer (or the anode current collector), has a thickness from 10 nm to 500 µm, and comprises an elastic polymer foam having a fully recoverable compressive elastic strain from 2% to 500% and wherein the anode active material layer contains a layer of lithium or lithium alloy, in a form of a foil, coating, or aggregate of multiple particles, as an anode active material and the pores contain interconnected pores. Preferably, the polymer foam is an open-cell foam.

Preferably, the elastic polymer foam contains an elastomer selected from a sulfonated or non-sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

Preferably, the anode-protecting layer is a discrete layer (not to be dissolved in the electrolyte) that is disposed between the anode current collector (e.g. Cu foil) or anode active material layer (e.g. Li foil) and the porous separator or solid state electrolyte. The anode-protecting layer may contain a liquid electrolyte that permeates or impregnates into the elastic polymer foam.

We have discovered that the anode-protecting layer provides several unexpected benefits: (a) the formation of dendrite has been essentially eliminated; (b) uniform deposition of lithium back to the anode side is readily achieved; (c) the layer ensures smooth and uninterrupted transport of lithium ions from/to the lithium foil/coating layer (or the anode current collector layer) and through the interface between the lithium foil/coating and the protective layer with minimal interfacial resistance; (d) significant reduction in the amount of dead lithium particles near the Li foil; and (e) cycle stability can be significantly improved and cycle life increased.

In a conventional lithium metal cell, as illustrated in FIG. 1, the anode active material (lithium) is deposited in a thin film form or a thin foil form directly onto an anode current collector (e.g. a Cu foil). The battery is a lithium metal battery, lithium sulfur battery, lithium-air battery, lithium-selenium battery, etc. As previously discussed in the Background section, these lithium secondary batteries have the dendrite-induced internal shorting and "dead lithium" issues at the anode.

Figure 2:
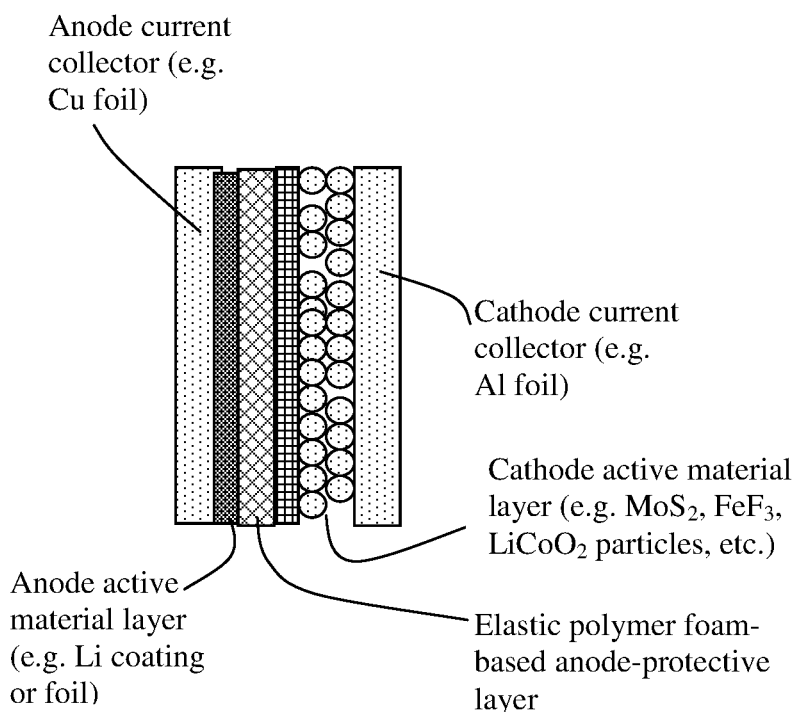
FIG. 2 Schematic of a presently invented lithium metal battery cell containing an anode layer (a thin Li foil or Li coating deposited on a surface of a current collector, Cu foil), a sulfonated elastomer composite foam-based anode-protecting layer, a porous separator/electrolyte layer (or a layer of solid-state electrolyte), and a cathode active material layer, which is composed of particles of a cathode active material, a conductive additive (not shown) and a resin binder (not shown). A cathode current collector supporting the cathode active layer is also shown.

We have solved these challenging issues that have troubled battery designers and electrochemists alike for more than 30 years by developing and implementing an anode-protecting layer disposed between the lithium foil/coating and the separator/electrolyte layer. As schematically shown in FIG. 2, one embodiment of the present invention is a lithium metal battery cell containing an anode layer (e.g. a thin Li foil or Li coating deposited on a surface of a current collector, such as a layer of graphene foam or a sheet of Cu foil) supported by an anode current collector, one anode-protecting layer, and a cathode active material layer, which is composed of particles of a cathode active material, a conductive additive (not shown) and a resin binder (not shown). A cathode current collector (e.g. Al foil) supporting the cathode active layer is also shown in FIG. 2. The lithium metal or alloy in the anode may be in a form of particles (e.g. surface-protected or surface-stabilized particles of Li or Li alloy).

The elastic polymer foam exhibits an elastic deformation of at least 2% when measured under uniaxial compression. In the field of materials science and engineering, the "elastic deformation" is defined as a deformation of a material (when being mechanically stressed) that is essentially fully recoverable upon release of the load and the recovery is essentially instantaneous. The elastic deformation is preferably greater than 5%, more preferably greater than 10%, further more preferably greater than 30%, and still more preferably greater than 100% but less than 500%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

If a solid state electrolyte is used, it may not be necessary to implement a porous separator membrane. If the cathode side contains some lithium ion source (e.g. Li in $LiCoO_2$ or LiMn$_2$O$_4$, etc.), the anode side can have only a current collector layer (no Li foil or coating layer) and an elastic polymer foam layer.

Again, it may be noted that although FIG. 2 shows a lithium coating pre-existing at the anode when the lithium battery is made, this is but one of several embodiments of the instant invention. An alternative embodiment is a lithium battery that does not contain a lithium foil or lithium coating at the anode (only an anode current collector, such as a Cu foil or a graphene/CNT mat) when the battery is made. The needed amount of lithium to be bounced back and forth between the anode and the cathode is initially stored in the cathode active material (e.g. lithium vanadium oxide Li$_x$V$_2$O$_5$, instead of vanadium oxide, V$_2$O$_5$; or lithium transition metal oxide or phosphate, instead of, say, MoS$_2$). During the first charging procedure of the lithium battery (e.g. as part of the electrochemical formation process), lithium comes out of the cathode active material, migrates to the anode side, and deposits on the anode current collector. The presence of the presently invented protective layer enables uniform deposition of lithium ions on the anode current collector surface. Such an alternative battery configuration avoids the need to have a layer of lithium foil or coating being present during battery fabrication. Bare lithium metal is highly sensitive to air moisture and oxygen and, thus, is more challenging to handle in a real battery manufacturing environment. This strategy of pre-storing lithium in the lithiated (lithium-containing) cathode active materials, such as Li$_x$V$_2$O$_5$ and Li$_2$S$_x$, makes all the materials safe to handle in a real manufacturing environment. Cathode active materials, such as Li$_x$V$_2$O$_5$ and Li$_2$S$_x$, are typically less air-sensitive.

The presently invented lithium secondary batteries can contain a wide variety of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic cathode active material may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

In certain preferred embodiments, the inorganic material as a cathode active material for the lithium battery is selected from a metal fluoride or metal chloride including the group consisting of CoF$_3$, MnF$_3$, FeF$_3$, VF$_3$, VOF$_3$, TiF$_3$, BiF$_3$, NiF$_2$, FeF$_2$, CuF$_2$, CuF, SnF$_2$, AgF, CuCl$_2$, FeCl$_3$, MnCl$_2$, and combinations thereof. In certain preferred embodiments, the inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, V, or VO; Mb is selected from Fe, Mn, Co, Ni, V, Ti, Al, B, Sn, or Bi; and x+y≤1.

In certain preferred embodiments, the inorganic material as a cathode active material is selected from a transition metal dichalcogenide, a transition metal trichalcogenide, or a combination thereof. The inorganic material is selected from TiS$_2$, TaS$_2$, MoS$_2$, NbSe$_3$, MnO$_2$, CoO$_2$, an iron oxide, a vanadium oxide, or a combination thereof.

The cathode active material layer may contain a metal oxide containing vanadium oxide selected from the group consisting of VO$_2$, Li$_x$VO$_2$, V$_2$O$_5$, Li$_x$V$_2$O$_5$, V$_3$O$_8$, Li$_x$V$_3$O$_8$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein 0.1<x<5.

The cathode active material layer may contain a metal oxide or metal phosphate, selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphthylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

The thioether polymer is selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4 (ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

It is also advantageous to disperse a high-strength reinforcement material in the anode-protecting material to increase the strength and dendrite-penetrating strength of the elastic polymer foam layer. Suitable reinforcement materials include glass fibers, ceramic fibers (e.g. silicon carbide fibers), polymer fibers (e.g. aromatic polyamide fibers such as Kevlar fibers, nylon fibers, ultrahigh molecular weight polyethylene or UHMW-PE fibers, etc.), and ceramic discs, etc.

Typically, an elastomer is originally in a monomer or oligomer state that can be cured to form a cross-linked polymer that is highly elastic. Prior to curing, these polymers or oligomers are soluble in an organic solvent to form a polymer solution. An ion-conducting additive or a reinforcement may be added to this solution to form a suspension. A foaming agent or blowing agent is also added into the suspension. This solution or suspension can then be formed into a thin layer of polymer precursor on a surface of an anode current collector or a surface of a Li foil. The polymer precursor (monomer or oligomer and initiator) is then polymerized and cured to form a lightly cross-linked polymer while the blowing agent is activated concurrently to form pores in the polymer structure. This thin layer of polymer foam may be tentatively deposited on a solid substrate (e.g. surface of a polymer or glass), dried, and separated from the substrate to become a free-standing polymer layer. This free-standing layer is then laid on a lithium foil/coating or implemented between a lithium film/coating and a cathode layer. Polymer layer formation can be accomplished by using one of several procedures well-known in the art; e.g. spraying, spray-painting, printing, coating, extrusion-based film-forming, casting, etc.

One may dispense and deposit a layer of a sulfonated or un-sulfonated elastomer foam onto a primary surface of the anode active material layer. Further alternatively, one may prepare a separate free-standing discrete layer of the elastomer first. This elastomer foam layer is then laminated between an anode active material layer (or anode current collector layer alone), a porous separator layer/electrolyte assembly, and a cathode to form a battery cell.

Examples of non-elastomer polymeric foams include: (1) Ethylene-vinyl acetate (EVA) foam, the copolymers of ethylene and vinyl acetate; also referred to as polyethylene-vinyl acetate (PEVA); (2) Low-density polyethylene (LDPE) foam and Polyethylene foam; (3) Polyimide foam; (4) Polypropylene (PP) foam, including expanded polypropylene (EPP) and polypropylene paper (PPP); (5) Polystyrene (PS) foam, including expanded polystyrene (EPS) and extruded polystyrene foam (XPS); (6) Styrofoam, including extruded polystyrene foam (XPS) and sometimes expanded polystyrene (EPS); (7) Polyvinyl chloride (PVC) foam; and (8) polymethacrylimide (PMI). These are just examples and there substantially all types of polymers (thermoplastic or thermosetting) can be made into a foam structure. By adding a non-conducting reinforcement material, one actually can improve the reversibility of the compressive deformation of these thermoplastic polymer foams, contrary to the conventional wisdom that a reinforcement material decreases the deformation of polymers. Suitable reinforcement materials include glass fibers, ceramic fibers, polymer fibers, and ceramic discs, etc.

Some examples of preferred elastomeric or rubber foam include (a) Nitrile rubber (NBR) foam, the copolymers of acrylonitrile (ACN) and butadiene; (b) Polychloroprene foam or Neoprene; (c) Polyurethane (PU) foam (e.g. low-resilience polyurethane, memory foam, and Sorbothane.

A blowing agent or foaming agent is a substance which is capable of producing a cellular or foamed structure via a foaming process in a variety of materials that undergo hardening or phase transition, such as polymers (plastics and rubbers), glass, and metals. They are typically applied when the material being foamed is in a liquid state. The cellular structure in a matrix is typically created for the purpose of reducing density, increasing thermal resistance and acoustic insulation, while increasing the thickness and relative stiffness of the original polymer.

Blowing agents or related foaming mechanisms to create pores or cells (bubbles) in a matrix for producing a foamed or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

(e) Soluble and leachable agents: Soluble fillers, e.g. solid sodium chloride crystals mixed into a liquid urethane system, which is then shaped into a solid polymer part, the sodium chloride is later washed out by immersing the solid molded part in water for some time, to leave small inter-connected holes in relatively high density polymer products.

We have found that the above five mechanisms can all be used to create pores in the graphene materials while they are in a solid state. Another mechanism of producing pores in a graphene material is through the generation and vaporization of volatile gases by removing those non-carbon elements in a high-temperature environment. This is a unique self-foaming process that has never been previously taught or suggested.

The invention also provides a method of manufacturing a lithium battery, the method comprising: (a) providing a cathode active material layer and an optional cathode current collector to support the cathode active material layer; (b) providing an anode current collector layer alone or an anode active material layer (e.g. containing a lithium metal or lithium alloy foil or coating) supported by an anode current collector to support the lithium metal or lithium alloy foil or coating; (c) providing an anode-protecting layer of an elastic polymer foam having a recoverable compressive elastic strain from 2% to 500% (preferably from 5% to 300%), and a thickness from 10 nm to 500 µm (preferably from 10 nm to 100 µm), wherein the anode-protecting layer is disposed between the porous separator/electrolyte assembly and the anode active material layer (or the current collector) and in physical contact therewith; and (d) providing an electrolyte in contact with the anode active material layer and the cathode active material layer.

The invention also provides a method of improving the cycle-life of a lithium metal secondary battery (not including a lithium-sulfur battery or lithium-selenium battery). The method comprises implementing an elastic polymer foam-based, lithium ion-conducting anode-protecting layer between an anode active material layer and a separator-electrolyte assembly (e.g. a porous membrane or a solid state electrolyte layer).

In certain embodiments, the presently invented lithium secondary battery comprises at least the following layers: an anode current collector (e.g. a Cu foil or a graphene foam) or an anode active material layer (e.g. a discrete lithium foil, a lithium coating layer, or a layer of lithium particles) supported by an anode current collector, an anode-protecting layer (elastic polymer foam) substantially fully covering the anode active material layer, an electrolyte or combined porous separator/electrolyte, a cathode active material layer, and an optional cathode current collector (e.g. Al foil, graphene paper sheet, etc.).

There are many different sequences with which these individual layers may be produced and combined together to make a battery cell. For instance, one may produce all components in a free-standing form and then combine them together. Alternatively, one may produce certain components in single free-standing films but other components in a 2-layer or 3-layer structure, followed by combining these components and structures together. For instance, one may spray, cast, or coat an elastic polymer foam layer onto a primary surface of an anode current collector to form a two-layer structure. This two-layer structure is then laminated with other components (e.g. a porous separator, a cathode layer, and electrolyte) to form a battery cell. The electrolyte may be added before and/or after the cell is made.

Alternatively, the step of implementing an anode-protecting layer may be conducted by depositing a layer of an elastic polymer foam onto one primary surface of an anode active material layer. This step includes optionally compressing the protected anode to improve the contact between the anode-protecting layer and the anode active material layer, followed by combining the protected anode, a separator, and a cathode together to form a lithium metal secondary battery. A good contact between the anode active material layer and the anode-protecting layer is essential to reducing internal resistance.

In certain embodiments, the step of implementing an anode-protecting layer is conducted by forming a protecting layer of elastic polymer foam, followed by laminating the anode active material layer, the elastic polymer foam layer, a porous membrane, a cathode layer, along with the electrolyte to form the lithium metal secondary battery, wherein an optional (but desirable) compressive stress is applied to improve the contact between the anode-protecting layer and the anode active material layer during or after this laminating step.

Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

A broad array of elastomers can be sulfonated to become sulfonated elastomers. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, an elastomer can form a polymer matrix composite containing a lithium ion-conducting additive dispersed in the elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the elastomer can be mixed with a lithium ion-conducting additive, which contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The electrolyte for a lithium secondary cell may be an organic electrolyte, ionic liquid electrolyte, gel polymer electrolyte, quasi-solid electrolyte (e.g. containing 2M-14 M of a lithium salt in a solvent) or a combination thereof. The electrolyte typically contains an alkali metal salt (lithium salt, sodium salt, and/or potassium salt) dissolved in a solvent.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K-S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a lithium metal cell.

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130 to 230° C. (266-446° F.), while some of the more common exothermic foaming agents decompose around 200° C. (392° F.). However, the decomposition range of most exothermic CFAs can be reduced by addition of certain compounds. Examples of suitable chemical blowing agents include sodium bi-carbonate (baking soda), hydrazine, hydrazide, azodicarbonamide (exothermic chemical blowing agents), nitroso compounds (e.g. N, N-Dinitroso pentamethylene tetramine), hydrazine derivatives (e.g. 4, 4'-Oxybis (benzenesulfonyl hydrazide) and Hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt).

Technically feasible blowing agents include carbon dioxide ($CO_2$), nitrogen ($N_2$), isobutane ($C_4H_{10}$), cyclopentane ($C_5H_{10}$), isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Example 2: Elastic Foam of Sulfonated and Non-Sulfonated Triblock Copolymer Poly(Styrene-Isobutylene-Styrene) or SIBS Both non-sulfonated and sulfonated elastomer foams are used to build the anode-protecting layer in the present invention. The sulfonated versions appear to be more compatible with lithium metal. The elastomer matrix can contain a lithium ion-conducting additive, an electronically non-conducting reinforcement, and/or a lithium metal-stabilizing additive.

An example of the sulfonation procedure used in this study for making a sulfonated elastomer is summarized as follows: a 10% (w/v) solution of SIBS (50 g) in methylene chloride (500 ml) was prepared. The solution was stirred and refluxed at approximately 40° C., while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50° C. for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 0.5 to 2.5% (w/v). Desired amounts of Kevlar® fibers (du Pont), a blowing agent (baking soda), and a lithium metal-stabilizing additive (e.g. $LiNO_3$ and lithium trifluoromethanesulfonimide) were then added into the solution to form slurry samples. The slurry samples were slot-die coated on a PET plastic substrate to form layers of sulfonated elastomer composite foam. The lithium metal-stabilizing additives were found to impart stability to lithium metal-electrolyte interfaces.

Example 3: Preparation of Sulfonated Polybutadiene (PB) Foam

A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) and a desired amount of Nylon fibers (0%-40% by wt.) were introduced into the reactor, and the polymer solution was irradiated for 1 h at room temperature with UV light of 365 nm and power of 100 W.

The resulting thioacetylated polybutadiene (PB-TA)/Nylon fiber composite was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of foaming agent, sodium hydrogen carbonate) were added to the toluene solution of PB-TA at 50° C. followed by slow addition of 52.6 mL of hydrogen peroxide (35 wt %; 0.61 mol; $H_2O_2$/olefin molar ratio=5) in 20 min. We would like to caution that the reaction is autocatalytic and strongly exothermic. The resulting slurry was cast to obtain sulfonated polybutadiene (PB-SA) composite foam layers. It may be noted that nylon fibers or other additives may be added at different stages of the procedure: before, during or after BZP is added.

Example 4: Preparation of Sulfonated SBS Foam

Sulfonated styrene-butadiene-styrene triblock copolymer (SBS) based elastomer was directly synthesized. First, SBS is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in situ from HCOOH and 30% aqueous $H_2O_2$ solution at 70° C. for 4 h, using 1 wt. % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt. % TEAB/ESBS as a phase transfer catalyst and 5 wt. % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ (optionally along with an additive or reinforcement material, if not added earlier) was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

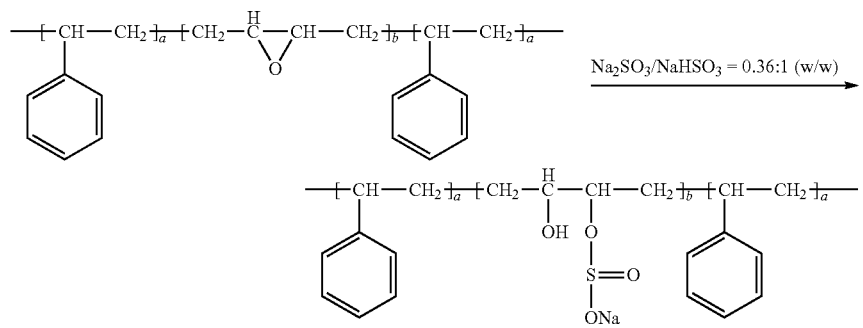

The reaction was terminated by adding a small amount of acetone solution containing antioxidant. The mixture was washed with distilled water, added with baking soda, and then precipitated by ethanol while being cast into thin films, followed by drying in a vacuum dryer at 50° C. It may be noted electronically non-conducting reinforcement (e.g. polymer fibers) and/or lithium ion-conducting additive (e.g. $Li_2CO_3$ and $NaBF_4$) may be added during various stages of the aforementioned procedure (e.g. right from the beginning, or prior to the ring opening reaction). The foaming agent was activated during the polymer curing stage to produce a lightly cross-linked polymer.

Example 5: Synthesis of Sulfonated SBS by Free Radical Addition of Thiolacetic Acid (TAA) Followed by In Situ Oxidation with Per-Formic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! The non-conductive reinforcement material was added before or after this reaction. The resulting slurry was stirred for 1 h, and then most of the solvent was distilled off in vacuum at 35° C. Finally, the slurry containing the sulfonated elastomer, along with desired additives and a blowing agent, was added with acetonitrile, cast into films, washed with fresh acetonitrile, and dried in vacuum at 35° C. to obtain layers of sulfonated elastomers.

Other elastomers (e.g. polyisoprene, EPDM, EPR, polyurethane, etc.) were sulfonated in a similar manner. Alternatively, all the rubber or elastomer foams can be directly immersed in a solution of sulfuric acid, a mixture of sulfuric acid and acetyl sulfate, or other sulfonating agent discussed above to produce sulfonated elastomer/rubber foams. Again, desired additives or reinforcement materials may be added at various stages of the procedure.

Example 6: Kevlar Fiber-Reinforced Polyvinyl Chloride (PVC) Foam

A composite foam based on expandable PVC microspheres reinforced with aramid fibers were prepared. The foam was fabricated by infiltrating low-density non-woven Kevlar fiber webbing with PVC microspheres. The assembly was subsequently heated to expand the foam. The resulting composite foam contains 10 wt. % aramid fibers and had a density from 0.05 to 0.1 g/cm$^3$. The procedure was similar to that proposed by the following reference: Lev Vaikhanski, et. al. "Fiber-reinforced composite foam from expandable PVC microspheres," Composites Part A: Vol. 34, December 2003, Pages 1245-1253. However, we cast the form to make a layer of reinforced foam less than 100 μm in thickness.

Example 7: Lithium Battery Containing a Sulfonated Elastomer-Protected Lithium Anode and a Cathode Containing $V_2O_5$ Particles Cathode active material layers were prepared from $V_2O_5$ particles and graphene-embraced $V_2O_5$ particles, respectively. The $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The Litexchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nanobelt sizes, and then spray-drying at 200° C. to obtain graphene-embraced $V_2O_5$ composite particulates. Selected amounts of $V_2O_5$ particles and graphene-embraced $V_2O_5$ particles, respectively, were then each made into a cathode layer following a well-known slurry coating process.

The sulfonated elastomer foam layers for use as an anode-protecting layer were SIBS as prepared in Example 2. Several compressive testing specimens were cut from the foam layers and tested with a universal testing machine. The results indicate that this series of sulfonated elastomer foams have an elastic deformation, the recoverable compressive strain, in the range from approximately 226-335%. The addition of up to 30% by weight of a reinforcement material (e.g. Kevlar fibers) and/or an inorganic additive typically reduces this elasticity down to a reversible tensile strain from 6% to 110%.

For electrochemical testing, the working electrodes (cathode layers) were prepared by mixing 85 wt. % $V_2O_5$ or 88% of graphene-embraced $V_2O_5$ particles, 5-8 wt. % CNTs, and 7 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter electrode (actually an anode of a Li-transition metal oxide cell), Celgard 2400 membrane as separator (for the cell containing no anode-protecting elastomer layer), and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s. The electrochemical performance of the cells were evaluated by galvanostatic charge/discharge cycling at a current density of 50 mA/g using an Arbin Electrochemical Testing Station.

Figure 3:
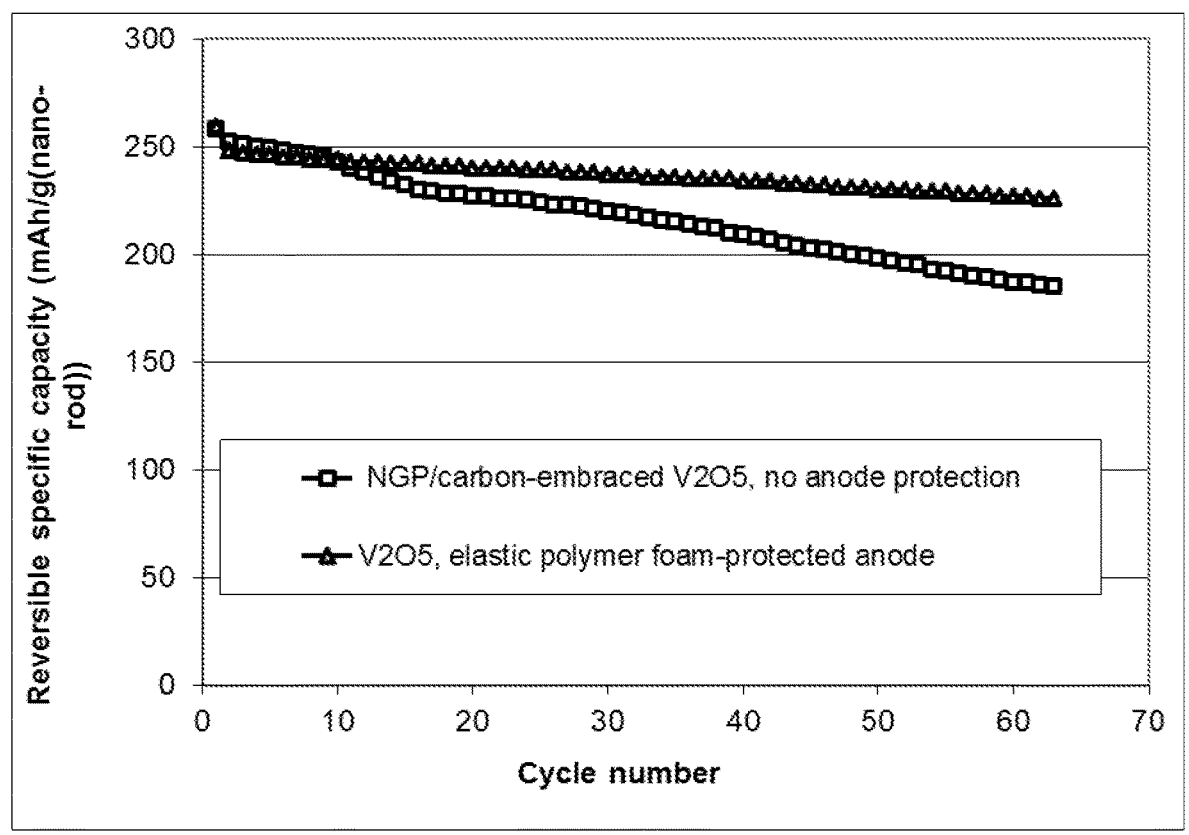
FIG. 3 The specific intercalation capacity curves of two lithium cells: one cell having a cathode containing $V_2O_5$ particles and a sulfonated elastomer foam-based anode-protecting layer disposed between the anode active material layer (Li foil) and the cathode layer and the other cell having a cathode containing graphene-embraced $V_2O_5$ particles, but having no anode-protecting protecting layer.

Summarized in FIG. 3 are the specific intercalation capacity curves of two lithium cells: one cell having a cathode containing $V_2O_5$ particles and a sulfonated elastomer foam-based anode-protecting layer disposed between the anode active material layer (Li foil) and the separator layer and the other cell having a cathode containing graphene-embraced $V_2O_5$ particles, but having no anode-protecting layer. As the number of cycles increases, the specific capacity of the un-protected cells drops at a much faster rate. In contrast, the presently invented approach of an elastic polymer foam-based anode-protecting layer provides the battery cell with a stable cycling behavior. These data have clearly demonstrated the surprising and superior performance of the presently invented anode protection approach for the lithium metal layer.

The sulfonated elastomer foam-based protective layer appears to be capable of reversibly deforming to a great extent without breakage when the lithium foil decreases in thickness during battery discharge. This elasticity feature enables the protecting layer to remain in a good contact with the lithium metal or current collector when the battery is discharged. Since there is no gap between the elastic protecting layer, the returning lithium ions during a subsequent recharge can more effectively deposit back to the current collector or the lithium metal supported thereon. The protective layer also prevents the continued reaction between liquid electrolyte and lithium metal at the anode, reducing the problem of continuing loss in lithium and electrolyte. This also enables a significantly more uniform deposition of lithium ions upon returning from the cathode during a battery re-charge step; hence, no lithium dendrite. These were observed by using SEM to examine the surfaces of the electrodes recovered from the battery cells after some numbers of charge-discharge cycles.

Example 8: Sulfonated Elastomer Foam Implemented in the Anode of a Lithium-$LiCoO_2$ Cell The sulfonated elastomer foam as a lithium-protecting layer was based on the sulfonated polybutadiene (PB) prepared according to a procedure used in Example 3. Compressive testing was also conducted on the sulfonated elastomer foam layers (without the reinforcement or additive material). This series of sulfonated elastomer foams can be elastically stretched up to approximately 110% (having some lithium salt or conductive reinforcement material dispersed therein) or up to 420% (with no additive).

Figure 4:
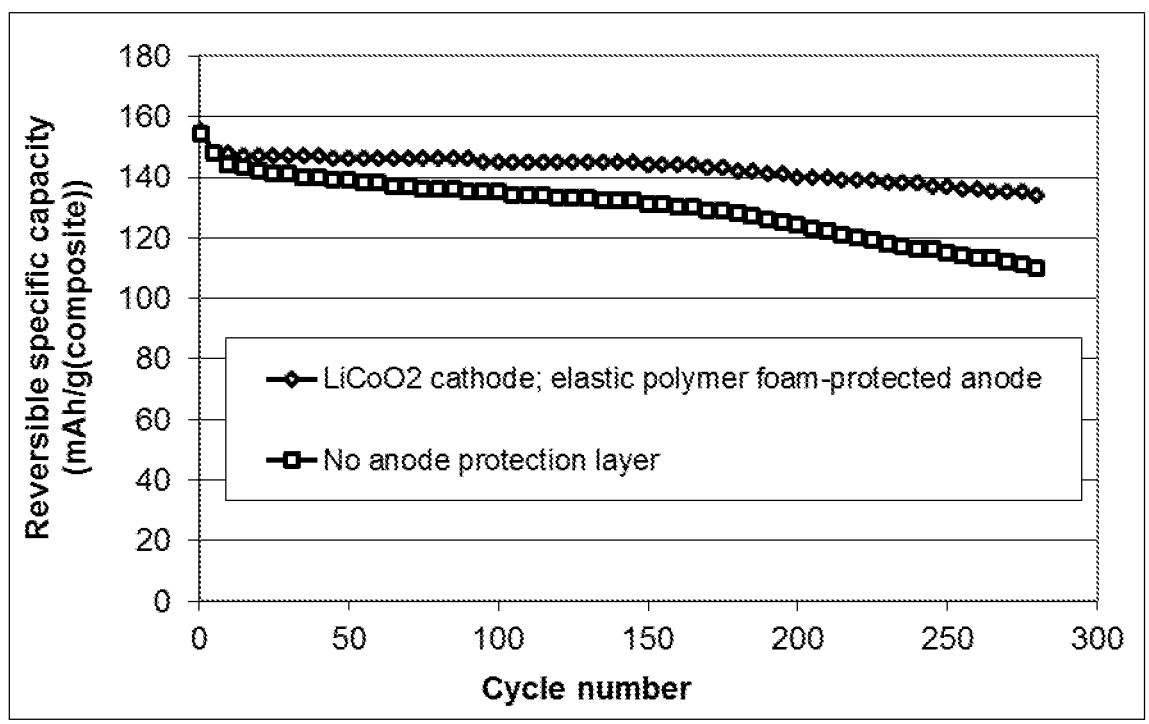
FIG. 4 The specific capacity values of two lithium-$LiCoO_2$ cells (initially the cell being lithium-free); one cell featuring a high-elasticity sulfonated elastomer foam layer at the anode and the other cell containing no anode protection layer.

FIG. 4 shows the specific lithium intercalation capacity of two lithium-$LiCoO_2$ cells (initially the cell being substantially lithium-free); one cell featuring a high-elasticity sulfonated elastomer foam layer at the anode and the other cell containing no anode protection layer. These data indicate that the cell having a sulfonated PB foam-based anode-protecting layer offers significantly more stable cycling behavior. The sulfonated elastomer foam also acts to isolate the liquid electrolyte from the lithium coating yet still allowing for easy diffusion of lithium ions.

Example 9: Li Metal Cells Containing Transition Metal Fluoride Nanoparticle-Based Cathode and a Sulfonated Elastomer Foam-Based Anode-Protecting Layer This sulfonated elastomer foam layer was based on sulfonated styrene-butadiene-styrene triblock copolymer (SBS). Compressive testing was conducted on some cut pieces of these layers. This series of cross-linked polymers can be elastically compressed up to approximately 445% (without any additive). The addition of additives results in an elasticity of approximately 15% (e.g. with 20% carbon black).

Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 µm. Each type of these metal fluoride particles, along with graphene sheets (as a conductive additive), was then added into an NMP and PVDF binder suspension to form a multiple-component slurry. The slurry was then slurry-coated on Al foil to form cathode layers.

Figure 5:
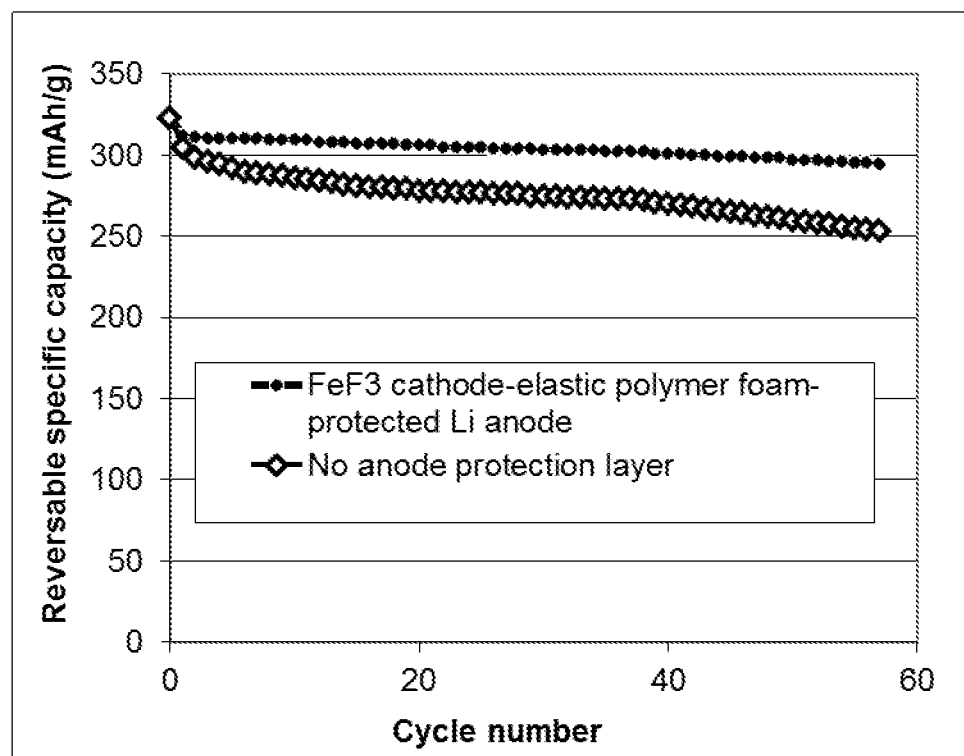
FIG. 5 The discharge capacity curves of two coin cells having a $FeF_3$-based of cathode active materials: (1) one cell having a high-elasticity sulfonated elastomer foam-protected anode; and (2) the other cell having no anode-protecting layer.

Shown in FIG. 5 are the discharge capacity curves of two coin cells having the same cathode active material ($FeF_3$), but one cell having a sulfonated elastomer foam-based anode-protecting layer and the other cell having no protective layer. These results have clearly demonstrated that the elastomer foam layer protection strategy provides the best protection against capacity decay of a lithium metal battery.

The elastomer foam layer appears to be capable of reversibly deforming without breakage when the anode layer expands and shrinks during charge and discharge. The elastomer foam layer also prevents continued reaction between the liquid electrolyte and the lithium metal. No dendrite-like features were found with the anode being protected by a sulfonated elastomer foam composite. This was confirmed by using SEM to examine the surfaces of the electrodes recovered from the battery cells after some numbers of charge-discharge cycles.

Example 10: Li-Organic Cell Containing a Naphthalocyanine/Reduced Graphene Oxide (FePc/RGO) Particulate Cathode and a Protected Li Foil Anode Particles of combined FePc/graphene sheets were obtained by ball-milling a mixture of FePc and RGO in a milling chamber for 30 minutes. The resulting FePc/RGO mixture particles were potato-like in shape. Two lithium cells were prepared, each containing a Li foil anode, and a cathode layer of FePc/RGO particles; one cell containing an anode-protecting layer without a porous separator, and the other having a conventional porous separator layer but no anode-protecting layer.

Figure 6:
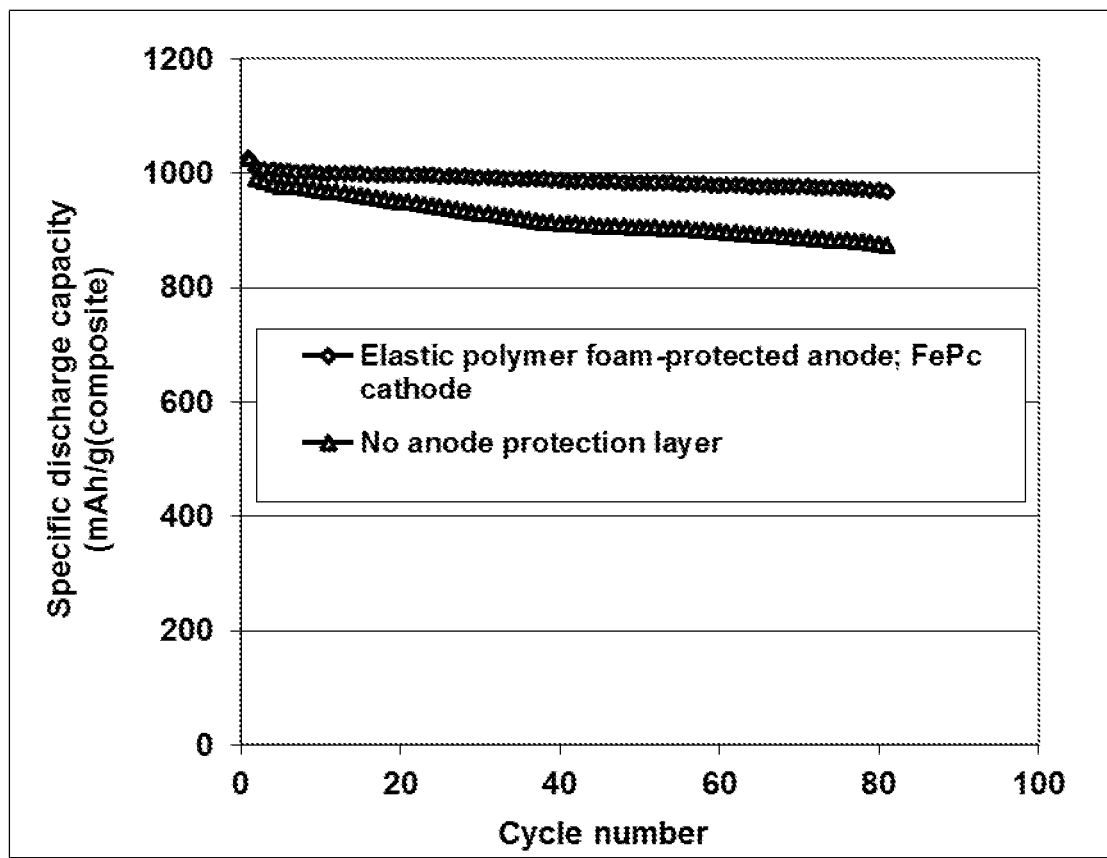
FIG. 6 Specific capacities of two lithium-FePc (organic) cells, each having Li foil as an anode active material and FePc/RGO mixture particles as the cathode active material (one cell containing an elastic foam-protected anode and the other no anode protection layer).

The cycling behaviors of these 2 lithium cells are shown in FIG. 6, which indicates that the lithium-organic cell having a sulfonated elastomer foam-based protection layer exhibits a significantly more stable cycling response. These protective layers reduce or eliminate the undesirable reactions between the lithium metal and the electrolyte, yet the elastomer foam layer itself remains in ionic contact with the protected lithium metal and is permeable to lithium ions. This approach has significantly increased the cycle life of all lithium-organic batteries.

Example 11: Cycle Stability of Various Rechargeable Lithium Battery Cells

In lithium-ion battery industry, it is a common practice to define the cycle life of a battery as the number of charge-discharge cycles that the battery suffers a 20% decay in capacity based on the initial capacity measured after the required electrochemical formation. Summarized in Table 1 below are the cycle life data of a broad array of batteries featuring an anode with or without an anode-protecting polymer foam layer.

TABLE 1

Cycle life data of various lithium secondary (rechargeable) batteries.

| Sample ID | Anode-protecting elastomer | Type & % of cathode active material | Initial capacity (mAh/g) | Cycle life (No. of cycles) |
|---|---|---|---|---|
| $CuCl_2$-1e | Sulfonated PU elastomer foam | 85% by wt. $CuCl_2$ particles (80 nm) + 7% graphite + 8% binder | 538 | 1256 |
| $CuCl_2$-2e | none | 85% by wt. $CuCl_2$ particles (80 nm) + 7% graphite + 8% binder | 536 | 112 |
| $BiF_3$-1e | none | 85% by wt. $BiFe_3$ particles + 7% graphene + 8% binder | 275 | 115 |
| $BiF_3$-2e | Sulfonated elastomer foam + 20% $LiNO_3$ | 85% by wt. $BiFe_3$ particles + 7% graphene + 8% binder | 276 | 1,028 |
| $Li_2MnSiO_4$-1e | sulfonated elastomer foam | 85% C-coated $Li_2MnSiO_4$ + 7% CNT + 8% binder | 254 | 1,522 |
| $Li_2MnSiO_4$-2e | none | 85% C-coated $Li_2MnSiO_4$ + 7% CNT + 8% binder | 252 | 543 |
| $Li_6C_6O_6$-1e | sulfonated elastomer foam + 5% Kevlar fibers | $Li_6C_6O_6$-graphene ball-milled | 439 | 1,221 |
| $Li_6C_6O_6$-2e | none | $Li_6C_6O_6$-graphene ball-milled | 438 | 116 |
| $MoS_2$-1e | Elastic glass fiber reinforced PP foam | 85% $MoS_2$ + 8% graphite + binder | 224 | 1,152 |
| $MoS_2$-2e | none | 85% $M0S_2$ + 8% graphite + binder | 225 | 156 |

In conclusion, the elastic polymer foam-based anode-protecting layer is surprisingly effective in alleviating the problems of lithium metal dendrite formation and lithium metal-electrolyte reactions that otherwise lead to rapid capacity decay and potentially internal shorting and explosion of the lithium secondary batteries. The elastic polymer foam layer appears to be capable of expanding or shrinking congruently or conformably with the anode active material layer. This capability helps to maintain a good contact between the current collector (or the lithium film itself) and the protective layer, enabling uniform re-deposition of lithium ions without interruption.

I claim:

1. A lithium metal secondary battery comprising a cathode, an anode, an electrolyte-separator assembly disposed between said cathode and said anode, wherein said anode comprises:
   a) an anode active material layer containing a layer of lithium or lithium alloy, in a form of a foil, coating, or multiple particles aggregated together, as an anode active material, wherein said anode active material layer is optionally supported by an anode current collector; and b) an anode-protecting layer in physical contact with said anode active material layer and in ionic contact with said electrolyte-separator assembly, wherein said anode-protecting layer has a thickness from 10 nm to 500 μm and comprises an elastic polymer foam having a fully recoverable compressive elastic strain from 2% to 500% and pores having a pore volume fraction from 5% to 95% based on the polymer foam volume and wherein said pores contain interconnected pores, wherein the anode-protecting layer reduces or eliminates reactions between the lithium metal and the electrolyte;

wherein said battery does not include lithium-sulfur battery or lithium-selenium battery.

2. The lithium metal secondary battery of claim 1, wherein said electrolyte-separator assembly comprises an electrolyte or a combined porous separator/electrolyte in ionic contact with said anode and said cathode.

3. The lithium metal secondary battery of claim 1, wherein said anode active material layer, said anode-protecting layer, and said cathode are laminated together in such manner that the battery is under a compressive stress or strain.

4. The lithium metal secondary battery of claim 1, wherein said elastic polymer foam contains a polymer selected from a non-sulfonated or sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poi y(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

5. The lithium metal secondary battery of claim 1, wherein said elastic polymer foam comprises from 0.01% to 50% of an electrically non-conducting reinforcement material dispersed in said polymer foam to form an elastic reinforced polymer foam, wherein said reinforcement material is selected from a glass fiber, ceramic fiber, polymer fiber, glass particle, ceramic particle, polymer particle, or a combination thereof.

6. The lithium metal secondary battery of claim 5, wherein said elastic reinforced polymer foam contains a reinforced elastomer foam or a reinforced thermoplastic foam.

7. The lithium metal secondary battery of claim 6, wherein said reinforced thermoplastic foam contains a thermoplastic resin selected from ethylene-vinyl acetate (EVA), polyethylene, polyimide, polypropylene (PP), polystyrene (PS), high-impact polystyrene, polyvinyl chloride (PVC), polymethacrylimide (PMI), a co-polymer thereof, or a combination thereof.

8. A lithium metal secondary battery comprising a cathode, an anode, an electrolyte-separator assembly disposed between said cathode and said anode, wherein said anode comprises:
a) an anode active material layer containing a layer of lithium or lithium alloy, in a form of a foil, coating, or multiple particles aggregated together, as an anode active material, wherein said anode active material layer is optionally supported by an anode current collector; and b) an anode-protecting layer in physical contact with said anode active material layer and in ionic contact with said electrolyte-separator assembly, wherein said anode-protecting layer has a thickness from 10 nm to 500 μm and comprises an elastic polymer foam having a fully recoverable compressive elastic strain from 2% to 500% and pores having a pore volume fraction from 5% to 95% based on the polymer foam volume and wherein said pores contain interconnected pores;
wherein said battery does not include lithium-sulfur battery or lithium-selenium battery,
wherein said elastic polymer foam further contains from 0.1% to 40% by weight of a lithium ion-conducting additive dispersed therein.

9. The lithium metal secondary battery of claim 8, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

10. The lithium metal secondary battery of claim 8, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato) borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

11. The lithium metal secondary battery of claim 1, wherein said cathode active material is selected from an inorganic material, an organic material, a polymeric material, or a combination thereof, and said inorganic material does not include sulfur or alkali metal polysulfide.

12. The lithium metal secondary battery of claim 11, wherein said inorganic material is selected from a metal oxide, metal phosphate, metal silicide, metal selenide, transition metal sulfide, or a combination thereof.

13. The lithium metal secondary battery of claim 11, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, CuF, $SnF_2$, AgF, $CuCl_2$, $FeCl_3$, $MnCl_2$, and combinations thereof.

14. The lithium metal secondary battery of claim 11, wherein said inorganic material is selected from a transition metal dichalcogenide, a transition metal trichalcogenide, or a combination thereof.

15. The lithium metal secondary battery of claim 11, wherein said inorganic material is selected from $TiS_2$, $TaS_2$, $MoS_2$, $NbSe_3$, $MnO_2$, $CoO_2$, an iron oxide, a vanadium oxide, or a combination thereof.

16. The lithium metal secondary battery of claim 11, wherein said metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$.

17. The lithium metal secondary battery of claim 11, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

18. The lithium metal secondary battery of claim 11, wherein said organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, Li$_4$C$_6$O$_6$, Li$_2$C$_6$O$_6$, Li$_6$C$_6$O$_6$, or a combination thereof.

19. The lithium metal secondary battery of claim 18, wherein said thioether polymer is selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

20. The lithium metal secondary battery of claim 11, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

21. A lithium metal secondary battery comprising a cathode, an anode, an electrolyte-separator assembly disposed between said cathode and said anode, wherein said anode comprises:
A) an anode current collector; and
B) an anode-protecting layer supported by said anode current collector and in ionic contact with said electrolyte-separator assembly, wherein said anode-protecting layer has a thickness from 10 nm to 500 μm and comprises an elastic polymer foam having a fully recoverable compressive elastic strain from 2% to 500% and pores having a pore volume fraction from 5% to 95% based on the polymer foam volume and wherein said pores contain interconnected pores, wherein the anode-protecting layer reduces or eliminates reactions between the lithium metal and the electrolyte;
wherein said battery does not include lithium-sulfur battery or lithium-selenium battery.

22. The lithium metal secondary battery of claim 21, wherein said electrolyte is selected from organic liquid electrolyte, ionic liquid electrolyte, polymer gel electrolyte, solid-state electrolyte, quasi-solid electrolyte having a lithium salt dissolved in an organic or ionic liquid with a lithium salt concentration higher than 2.0 M, or a combination thereof.

23. The lithium metal secondary battery of claim 21, wherein said anode current collector, said anode-protecting layer, and said cathode are laminated together in such manner that the battery is under a compressive stress or strain.

24. The lithium metal secondary battery of claim 21, wherein said elastic polymer foam contains a polymer selected from a non-sulfonated or sulfonated version of natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, metallocene-based poly(ethylene-co-octene) elastomer, poly(ethylene-co-butene) elastomer, styrene-ethylene-butadiene-styrene elastomer, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

25. The lithium metal secondary battery of claim 21, wherein said cathode active material is selected from an inorganic material, an organic material, a polymeric material, or a combination thereof, and said inorganic material does not include sulfur or alkali metal polysulfide.

26. The lithium metal secondary battery of claim 25, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

27. The lithium metal secondary battery of claim 25, wherein said inorganic material is selected from a lithium transition metal silicate, denoted as Li$_2$MSiO$_4$ or Li$_2$Ma$_x$Mb$_y$SiO$_4$, wherein M and Ma are selected from Fe, Mn, Co, Ni, V, or VO; Mb is selected from Fe, Mn, Co, Ni, V, Ti, Al, B, Sn, or Bi; and x+y≤1.

28. The lithium metal secondary battery of claim 25, wherein said metal oxide or metal phosphate is selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

* * * * *